United States Patent [19]
Chang

[11] Patent Number: 5,160,829
[45] Date of Patent: Nov. 3, 1992

[54] ELECTRIC HEAT-CONVECTION STOVE WITH TRANSPARENT HOUSING

[76] Inventor: Kwei T. Chang, No. 14, Lane 54, Luong Chuan St., Panchiao, Taipei Hsien, Taiwan

[21] Appl. No.: 673,911

[22] Filed: Mar. 25, 1991

[51] Int. Cl.$^5$ .......................... F27B 1/00; A21B 1/26
[52] U.S. Cl. ........................... 219/400; 126/21 A; 126/21 R
[58] Field of Search .............. 219/400, 391, 385, 386, 219/408, 413, 392; 126/21 R, 21 A, 37 R; 109/59 R, 78, 79; 248/125, 132, 345.1; 312/236, 237, 338, 265.1–265.6; 392/422

[56] References Cited

U.S. PATENT DOCUMENTS

| | | | |
|---|---|---|---|
| 2,907,859 | 10/1959 | Walkoe | 219/391 |
| 3,154,004 | 10/1964 | Huck | 392/422 |
| 3,224,823 | 12/1965 | Schulze | 312/265.5 |
| 3,402,281 | 9/1968 | Vonderhaar | 219/391 |
| 3,684,860 | 8/1972 | Snyder | 219/413 |
| 4,020,322 | 4/1977 | Muse | 219/392 |
| 4,045,104 | 8/1977 | Peterson | 312/265.5 |

FOREIGN PATENT DOCUMENTS 2725117 12/1978 Fed. Rep. of Germany.
0174624 10/1982 Japan.

OTHER PUBLICATIONS

Consumer Report Magazine, Nov. 1979, pp. 644-646.

Primary Examiner—Bruce A. Reynolds
Assistant Examiner—Tuan Vinh To
Attorney, Agent, or Firm—Lowe, Price, LeBlanc & Becker

[57] ABSTRACT

An electric heat-convection stove, comprising an electric heat-convection control unit having four alloy posts respectively connected thereto at the four corners thereof for mounting three glass side boards, a front panel and a base. The three glass side boards, the front panel and the base are interchangeable so that various alternations can be achieved. A rack is fastened inside the stove for holding foods. Two pawl means and two spring means are respectively connected between the rack and the front panel so that the front panel can be rotated to an open the stove or automatically pulled back to close the stove. A grease collector can be drawn out for cleaning and then pushed back into place.

1 Claim, 5 Drawing Sheets

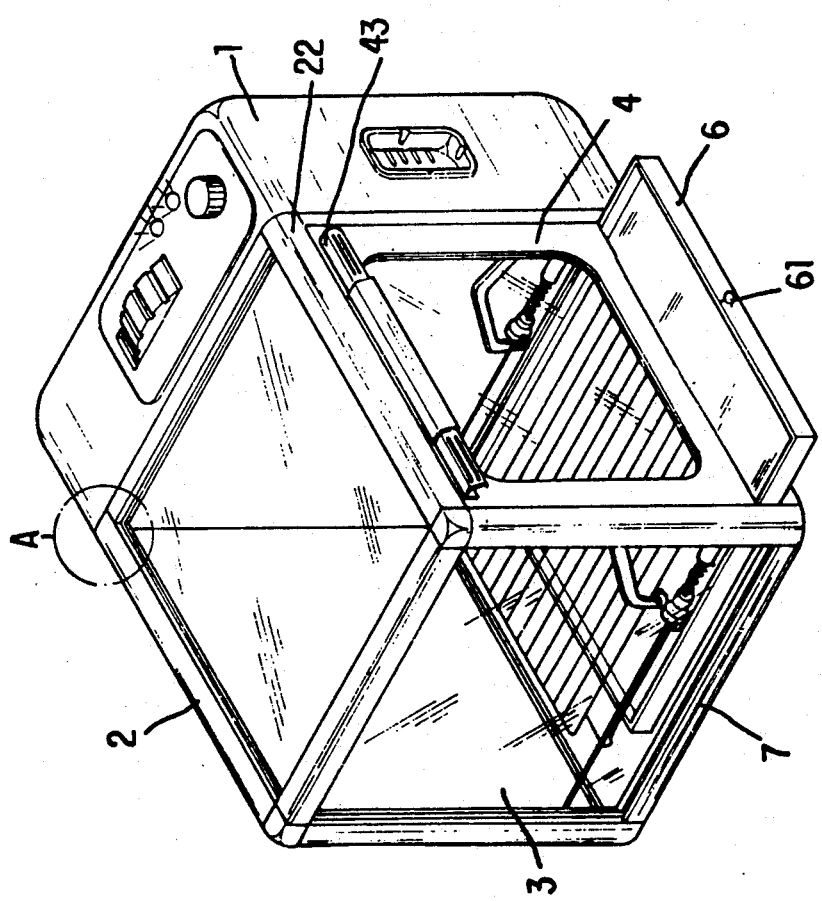
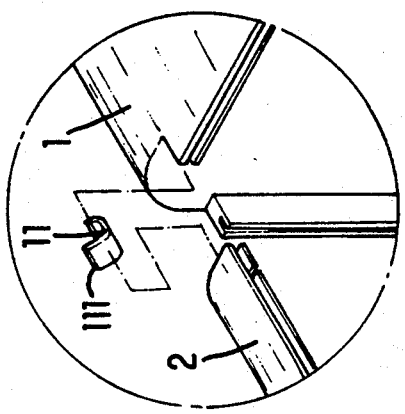
FIG. 5
FIG. 5A

ELECTRIC HEAT-CONVECTION STOVE WITH TRANSPARENT HOUSING

BACKGROUND AND SUMMARY OF THE INVENTION

The present invention relates to electric stoves and relates more particularly to a built-up type electric heat-convection stove with transparent housing which can be conveniently alternatively assembled into various combinations according to different requirements.

In U.S. Pat. No. 07/532,540 there is disclosed an electric heat-convection stove which is comprised of a base having set therein a heat-convection mechanism covered with a transparent hood of reinforcing glass and defining therein a roasting chamber for cooking, which transparent hood is built up with four zinc alloy posts, a front panel, three side boards and a top board; and a perforated tray mounted on the heat-convection mechanism for circulating heat current and collecting grease. In this structure of electric heat-convection stove, the door through which food is placed in the roast chamber therein is set at a fixed location. The present invention is an improvement on the cited structure of electric heat-convection stove.

SUMMARY OF THE INVENTION

The present invention is to provide an electric heat-convection stove which comprises an electric heat-convection control unit having four alloy posts respectively connected thereto at the four corners thereof for mounting three glass side boards, a front panel and a base. The three glass side boards, the front panel and the base are interchangeable so that various alternations can be achieved. A rack is fastened inside the stove for holding foods. Two pawl means and two spring means are respectively connected between the rack and the front panel so that the front panel can be rotated to an open the stove or automatically pulled back to close the stove. A grease collector can be drawn out for cleaning and then pushed back into place.

BRIEF DESCRIPTION OF THE DRAWINGS

FIG. 4A is an enlarged view of section A FIG. 4;

FIG. 5 illustrates still another alternate combination of the present invention; FIG. 5A is an enlarged view of section A of FIG. 5;

DETAILED DESCRIPTION OF THE PREFERRED EMBODIMENT

Figures 1, 1A:
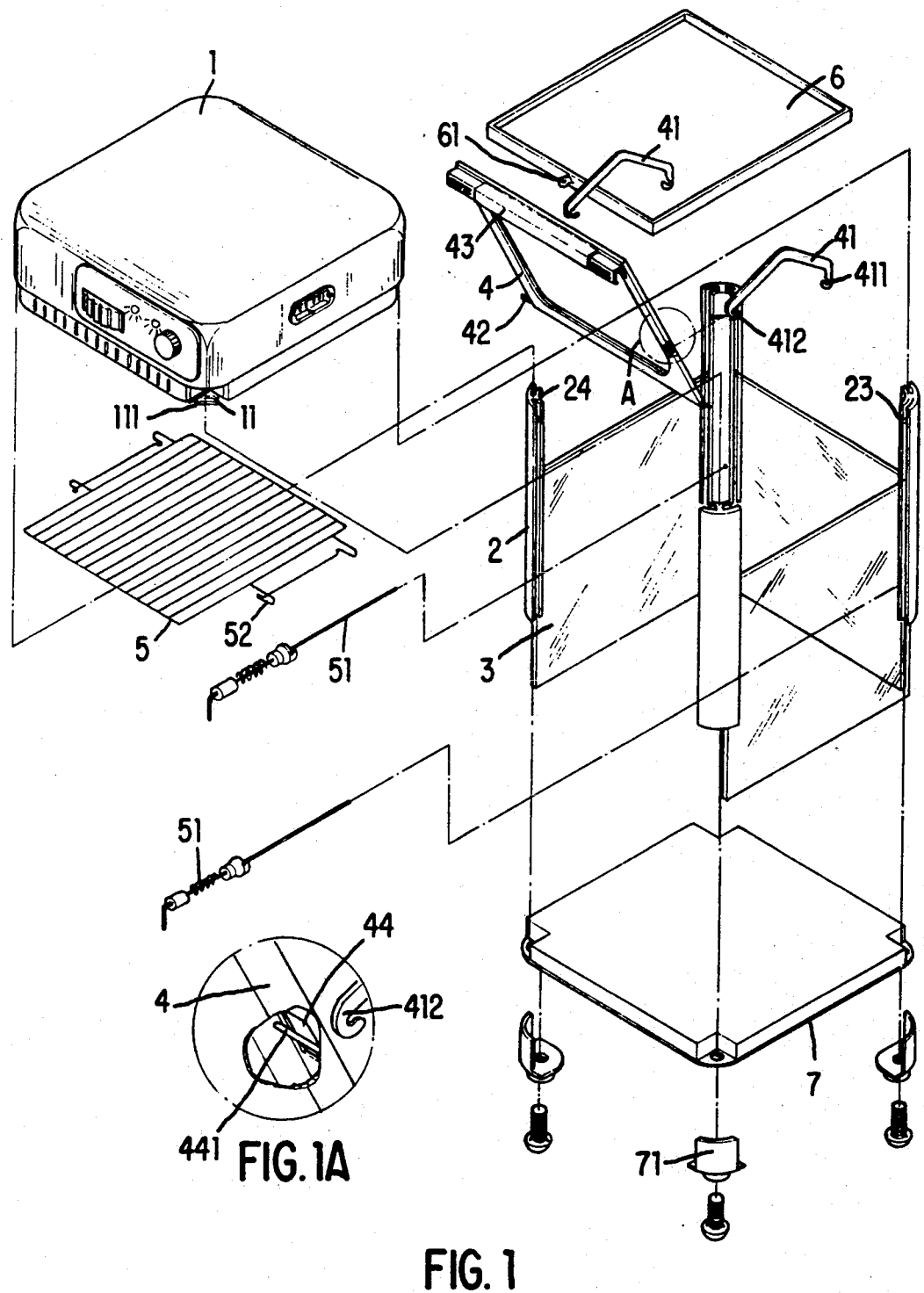
FIG. 1 is a perspective dismantled view of the preferred embodiment of the electric heat-convection stove of the present invention.
FIG. 1A is an enlarged view of section A of FIG. 1.
Figure 2:
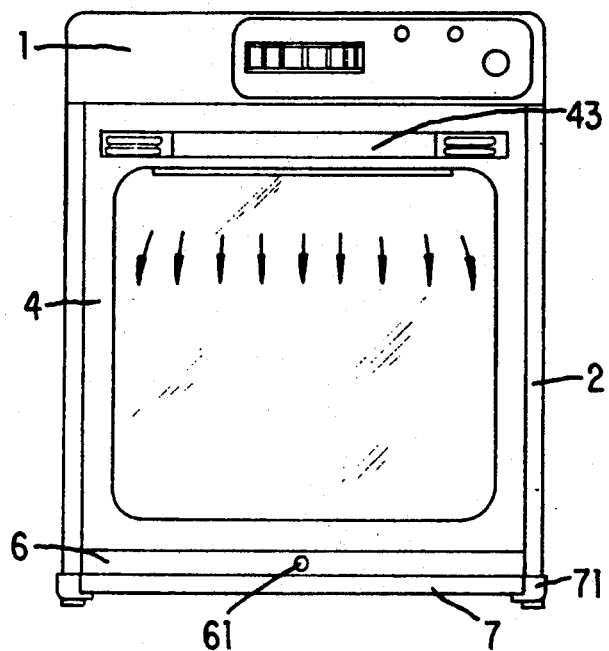
FIG. 2 is a front view thereof.
Figure 3:
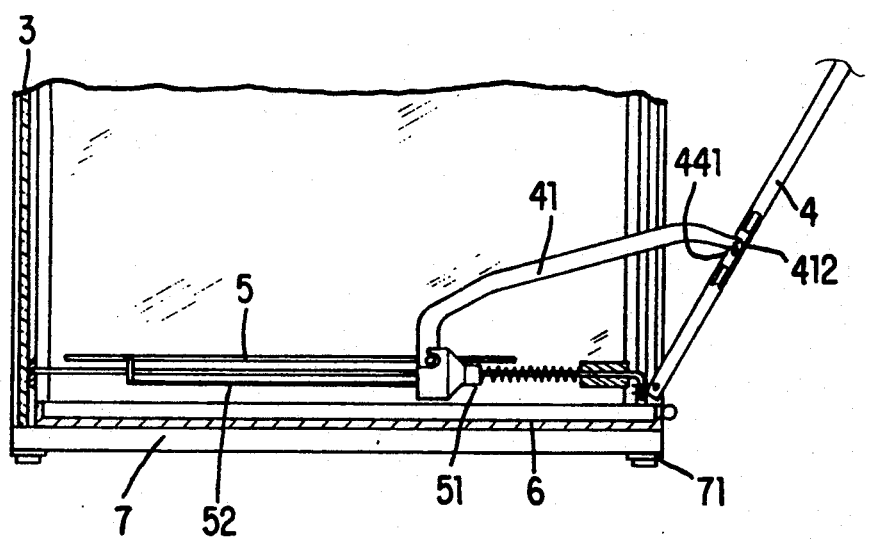
FIG. 3 illustrates the relative positioning of the lever pawl between the front panel and the rack 5.
Figure 4:
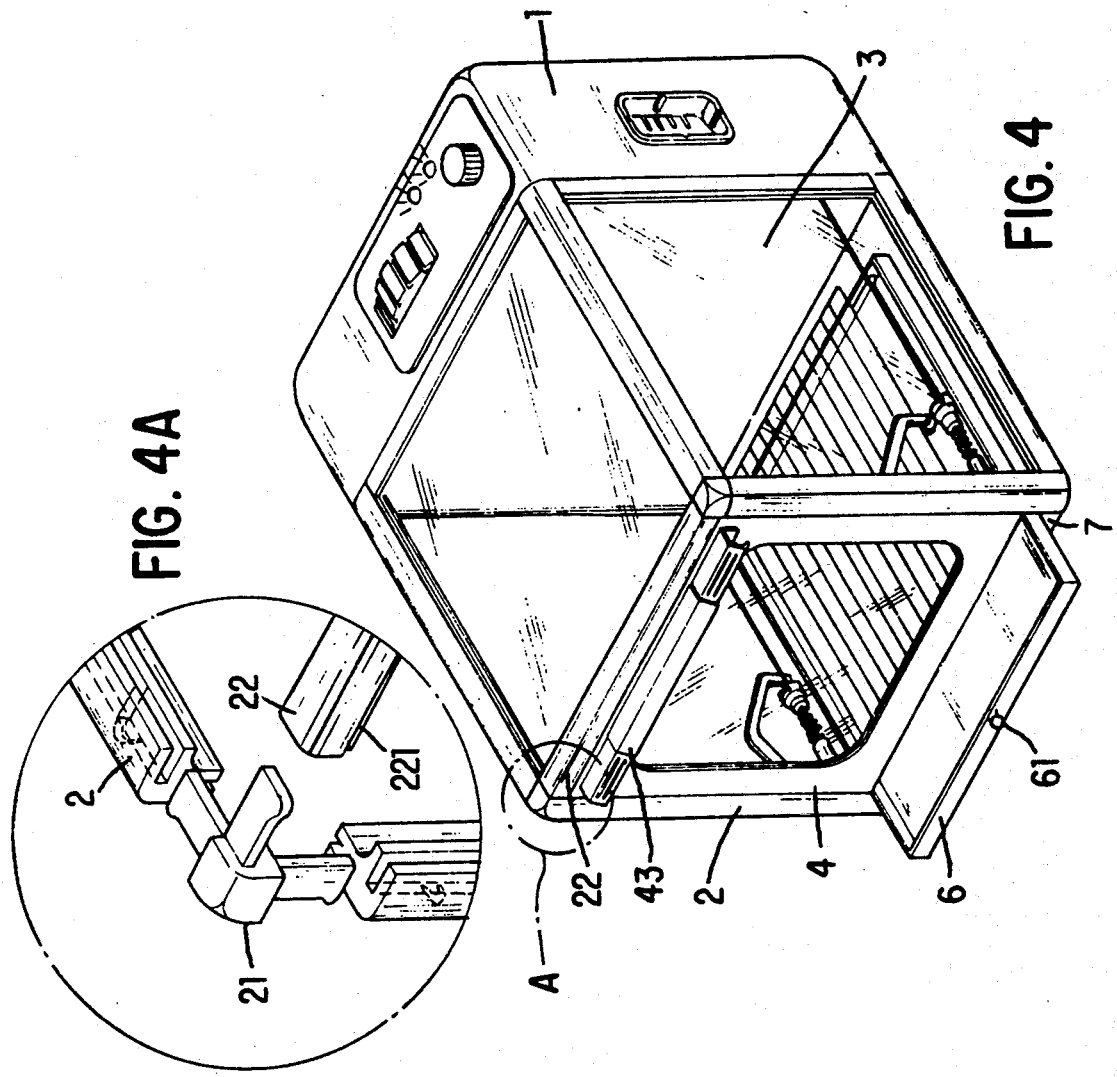
FIG. 4 illustrates an alternate combination of the present invention.
Figure 6:
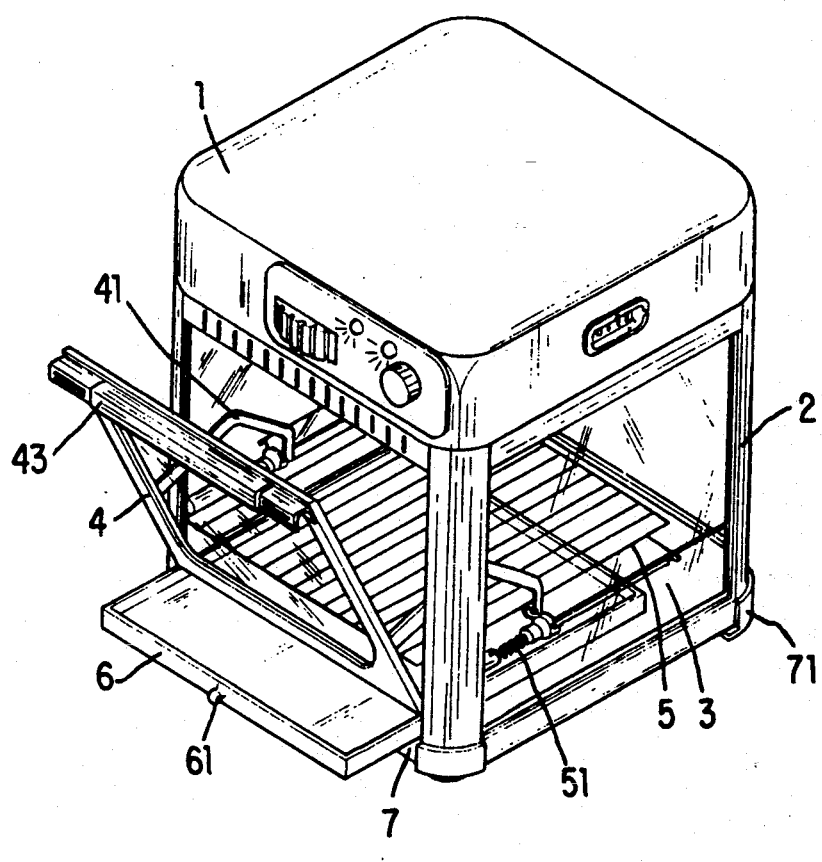
FIG. 6 illustrates a yet further alternate combination of the present invention.

Referring to the annexed drawings in greater detail, an electric heat-convection stove according to the present invention, is generally comprised of heat-convection control unit 1, alloy posts 2, three-way connectors 21, cross bars 22, glass side boards 3, front panel 4, rack 5, grease collector 6 and base 7.

Heat-convection control unit 1 has fastening tenons 11 at the four corners thereof of which each has a flange 111 for fastening an alloy post 2 each.

Alloy post 2 has a retaining notch 23 at one end for fastening the flange 111 of the fastening tenons 11 of the heat-convection control unit 1 two elongated channels 24 at two opposite sides for mounting glass side boards 3, and a fastening slot (not shown) at an opposite end for mounting the base 7. Three-way connector 21 is provided for joining alloy posts 2 and cross bars 22.

Glass side board 3 is made from reinforcing glass and mounted in the elongated channels 24 between each two alloy posts 2.

Front panel 4 has an elongated hand-hold 43 transversely disposed at the top, two stub axles 42 bilaterally disposed at the bottom, two notches 44 bilaterally disposed on the backside at suitable height which have each a cross rod 441 respectively set therein. Two lever pawls 41 are provided to connect the front panel 4 to the rack 5. The lever pawls 41 have each one end 411 hooked in the rack 5, and an opposite end hooked in the cross rod 412 in either notch 44 of the front panel 4.

Rack 5 has hooks 52 disposed at two opposite sides for fastening the lever pawls 41, and two spring means 51 at two opposite sides to match with the lever pawls 41 for controlling the pivot motion of the front panel 4.

Grease collector 6 has a finger knob 61 through which it can be conveniently pulled out of the stove of moved back into position.

Base 7 has four cushions 71 at the four corners thereof respectively fastened with the alloy posts 2 by screws.

The alloy posts 2 can be conveniently arranged to match with the heat-convection control unit 1, permitting the heat-convection control unit 1 to be alternatively disposed either at top, bottom, left or right position.

By means of the hooks 52 and the spring means 51 of rack 5 matching with the level pawls 41 of the front panel 4, the front panel 4 can be conveniently rotated outwards to an open position or automatically pulled back to a closed position. By means of three-way connectors 21 cross bars 22 are respectively connected between each two of the alloy posts 2. Each cross bar 22 has a flange 221 longitudinally disposed at one side for stopping the front panel 4. Further, the grease collector 6 can be conveniently pulled out of the stove for cleaning.

What is claimed is:

1. An electric heat-convection stove, comprising:
    a rectangular electric heat-convection control unit having four corners, and having fastening tenons at the four corners thereof, each of said fastening tenons having each a flange thereon;
    four alloy posts respectively connected to said electric heat-convection control unit at each of the four corners thereof, each post having a retaining notch at one end receiving the flange of a respective fastening tenon, and two spaced apart elongated channels along sides thereof;
    three rectangular glass side boards received in said elongated channels between each two of said alloy posts;
    a plurality of cross bars, one connected between each two of said alloy posts;
    a plurality of three-way connectors connecting respectively ends of said cross bars to said alloy posts;

a front door panel having an elongated hand-hold transversely disposed at the top, two stub axles bilaterally disposed at the bottom hingedly attaching said panel to two alloy posts, two notches bilaterally disposed on the backside at suitable height with a cross rod each respectively set therein;

two lever pawls and a rack, said pawls connecting said front panel to said rack, said rack having hooks disposed at two opposite sides for fastening said lever pawls, and two spring means at two opposite sides to match with said lever pawls for controlling the pivot motion of said front panel;

a grease collector having a finger knob on a front side for holding of fingers to pull it out of the stove or push it back into position the front side being disposed below the door panel; and a base having cushions at the four corners thereof for fastening the opposite end of each of said alloy posts respectively and for supporting said grease collector, said side boards having same dimensions in length and width.

* * * * *